United States Patent [19]

DeRudder

[11] Patent Number: 4,960,836

[45] Date of Patent: Oct. 2, 1990

[54] POLYAMIDE POLYCARBONATE BLOCK COPOLYMER

[75] Inventor: James L. DeRudder, Mt. Vernon, Ind.

[73] Assignee: General Electric Company, Mt. Vernon, Ind.

[21] Appl. No.: 394,689

[22] Filed: Aug. 16, 1989

[51] Int. Cl.$^5$ .................. C08G 69/44; C08G 64/18; C08L 69/00

[52] U.S. Cl. .................................. 525/423; 525/433

[58] Field of Search .................. 525/423, 433, 432

[56] References Cited

U.S. PATENT DOCUMENTS

| 4,732,934 | 3/1988 | Hathaway | 525/433 |
| 4,782,114 | 11/1988 | Perron et al. | 525/66 |
| 4,782,117 | 11/1988 | Lansberg et al. | 525/146 |
| 4,814,395 | 3/1989 | Rosenquist | 525/433 |

FOREIGN PATENT DOCUMENTS 227053  7/1987  European Pat. Off. ............ 525/423

Primary Examiner—Lewis T. Jacobs
Assistant Examiner—David Buttner
Attorney, Agent, or Firm—Martin Barancik; Joseph Eisele

[57] ABSTRACT

Polyamide-carbonate block copolymers are made by admixture of polyamides with carbonate polymers containing carboxyl groups or an ester groups capable of elimination to form carboxyl groups, in the presence of a polyepoxy linking agent, such as triglycidyl isocyanurate. Such block copolymers may be used as thermoplastics or as blending agents for polyamides and carbonate polymers.

28 Claims, No Drawings

POLYAMIDE POLYCARBONATE BLOCK COPOLYMER

BACKGROUND OF THE INVENTION

1. Field of the Invention

The invention is directed to compatible blends of polyamides and aromatic carbonate polymers useful as thermoplastics, and methods for making each compatible blends.

2. Brief Description of the Prior Art

Much effort has been expended on the problem of blending polyamides (especially nylons) with aromatic carbonate polymers (especially polycarbonates). Such blends and alloys are particularly useful for achieving simultaneously the good impact strength and dimensional stability characteristic of the carbonate polymers and the good solvent resistance, toughness, ease of processing and resistance to environmental stress cracking characteristic of the polyamides.

These two classes of polymers are normally not miscible, at least not without unacceptible delamination. In order to achieve miscibility and to obtain useful blends which exhibit no tendency to delaminate, various stratagems have been used. One method is to utilize a relatively more compatible type of amorphous polyamide as taught by Maresca et al. U.S. Pat. No. 4,798,874 (Jan. 1989). Another method is to compatibilize a polyamide with a polycarbonate or polyester carbonate by use of an effective amount of a polyamide-polyester block copolymer as taught by Maresca et al. in U.S. Pat. Nos. 4,788,248-9 (Nov. 29, 1988), or by use of an effective amount of a polyetherimide, a polyurethane or certain linear segmented thermoplastic elastomers as taught by Perren et al. in U.S. Pat. No. 4,782,114 (Nov. 1, 1988).

It has also been shown by Maresca, Eur. Pat. 227053 (July 1, 1987) that a compatibilizing agent with epoxy functional groups is useful for compatibilizing a polyamide with a carbonate polymer. However, this effect is not as complete as desired because the usual carbonate polymer lacks functional groups for chemical interaction with the epoxy compatibilizing agent.

In order to make this type of polyamide/polycarbonate block copolymer required as a compatibilizing agent, it it necessary to find a means of creating a functionalized polycarbonate onto which the polyamide segment can be attached by means of the functional chain ends of the polyamide, which are normally carboxyl and amino groups. Normally, aromatic carbonate polymers lack functional end groups. It is however known that aromatic carbonate polymers can be made having carboxyl end groups or ester side groups. The present invention offers an effective and convenient means for attaching the carboxyl or ester end groups of such an aromatic carbonate polymer to the end groups of the polyamide (polyamide), thus providing a graft polyamide-polycarbonate for use as such as a thermoplastic or for use as a compatibilizing agent in blending of polyamides with aromatic carbonate polymers.

SUMMARY OF THE INVENTION

The present invention provides polyamide-polycarbonate block copolymers and a method for preparing them by admixture of a polyamide with a carboxyl-terminated or ester side chain aromatic carbonate polymer having at least one terminal carboxyl or ester side chain, with an effective amount of a reactive linking agent comprising a polyepoxy compound, preferably triglycidyl isocyanurate, this admixture being conducted under conditions effecting the reaction of the linking agent with both the polyamide and the carbonate polymer.

The invention further provides a method for compatibilizing polyamides and carbonate polymers by admixing them with a compatibilizing amount of the block copolymer of the invention.

BRIEF DESCRIPTION OF THE INVENTION

The invention provides polycarbonate-polyamide copolymers suitable for use as such as thermoplastics or as compatibilizing agents for blending polycarbonates with polyamides.

In its compositional aspect, the invention comprises a block copolymer having at least one polyamide block and at least one carbonate polymer block, this block copolymer being the reaction product of:

(a) a polyamide (b) at least one thermoplastic carbonate polymer selected from the group consisting of carboxyl-terminated carbonate polymers and ester-side-chain modified carbonate polymers, this ester side chain being capable of forming a carboxyl group under the reaction conditions; and (c) an effective amount of a polyepoxy compound capable of linking (a) and (b) by reaction of epoxy groups with the carboxyl groups on (a) and (b) as well as with the amino groups on (a).

The invention further provides blends of carbonate polymers and polyamides with a compatibilizing amount of the above-described polyamide-polycarbonate block copolymer.

The polyamides suitable for use in practicing the invention are described in col. 6 line 53 to col. 8 line 51 of Maresca et al. (to General Electric Co.), U.S. Pat. No. 4,798,874 (Jan. 17, 1989) which is incorporated herein by reference. Preferred polyamides are those crystalline polyamides whose blends with polycarbonates will provide a beneficial balance of overall properties and amorphous polyamides that provide transparent blends with polycarbonates. Especially preferred polyamides for use in the present invention are amorphous polyamide nylon 6,I and the crystalline polyamides nylon 6 and nylon 6,6. It is generally recognized that polyamides have amino and carboxyl end groups and it is either or both of such end groups that provide the reactive sites for the polyamide in the context of the present invention.

Carboxyl-functionalized carbonate polymers are are highly suitable as reactant polymer (b) in the composition and process of the invention. A preferred group of such reactant polymers comprises carbonate polymers containing end groups of the formula $-O-R^1-O-C(=O)-O-A^1$ wherein each $R^1$ is independently a divalent aliphatic, alicyclic or aromatic radical and $A^1$ is a carboxylic acid-substituted phenoxy group or a functional derivative thereof. By a functional derivative is meant a derivative which under reaction conditions of the invention, forms a carboxylic acid group as an end group; an example is the tertiary-butyl ester which eliminates isobutylene to form a carboxylic acid. Further illustration of such carboxyl-functionalized polycarbonates is provided by Gambale, copending U.S. Patent Application Ser. No. 109,873, now U.S. Pat. No. 4,853,458 (filed Oct. 14, 1987) which is incorporated by reference thereto.

As a less preferred alternatives for component (b), the present invention can make use of carbonate polymers which have carboxyl side groups or ester side groups which can convert to carboxyl under the conditions of the invention. One such group of acid side group carbonate polymers is the class of copolyester-carbonate resins containing in the polymer chain at least one divalent moiety of the formula:

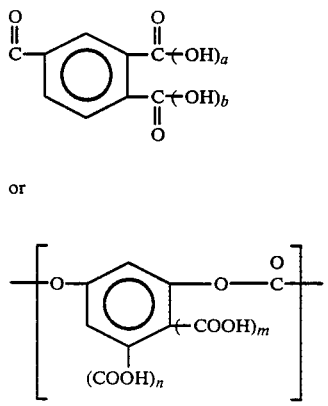

wherein a and b are each whole number integers of from 0 to 1 and the sum of a+b is 1, wherein m and n are whole number integers from 0 to 1 and the sum of m plus n equals 1.

Such polymers are further described in U.S. patent application Ser. No. 234,789 filed Aug. 22, 1988 now U.S. Pat. No. 4,826,928 which is incorporated herein by reference.

Another group of polycarbonate resins useful as component (b) in the present invention is the group characterized by having in the polymer chain at least one divalent moiety of the formula: —[—O—phenyl(-COOH)—(E)$_a$—phenyl(COOR')—O—C(=O)—]— wherein E is selected from the group consisting of alkylene containing from 1 to 15 carbon atoms, inclusive, and halogen-substituted alkylene containing from 1 to 15 carbon atoms, inclusive, a is an integer of 0 to 1 and R' is hydrogen or hydrocarbyl or halogen-substituted hydrocarbyl amenable to beta elimination (to form olefin and carboxyl group) upon thermal degradation. A precursor of this structure can also be used, having the formula: —[—O—phenyl(COOR)—(E)$_a$—phenyl(-COOR)—O—C(=O)—]— where E and a are as previously defined and each R is independent and is a hydrocarbyl group or a halogen-substituted hydrocarbyl group which is amenable to beta-elimination upon exposure to heat. Such polymers are described further in U.S. patent application Ser. No. 280,845 filed Dec. 7, 1988 now U.S. Pat. No. 4,912,194 which is incorporated herein by reference.

Another group of carbonate polymers which can be used as component (b) in the present invention are carbonate polymers having in the polymer chain at least one divalent moiety of the formula:

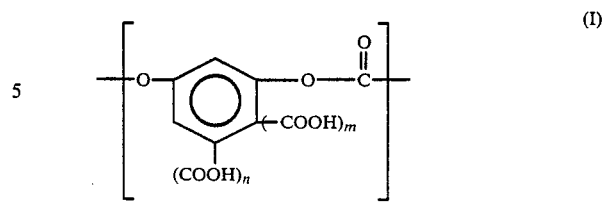

wherein m and n each represent a whole number integer of 0 to 1 and the sum of m plus n equals 1, or of the formula:

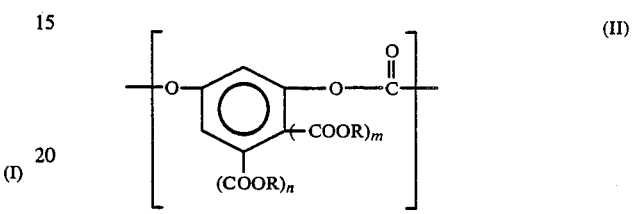

wherein m and n are as previously defined and each R is independent and is a hydrocarbyl group or a halogen-substituted hydrocarbyl group which is amenable to beta-elimination upon exposure to heat. These carbonate polymers are further described in U.S. application Ser. No. 280,847 filed Dec. 7, 1988 now U.S. Pat. No. 4,927,914 and which is incorporated herein by reference.

Any polyepoxy compound is capable of being used as component (c) in the present invention. These epoxy compounds may be poly(O- or N-epoxyalkyl-substituted cyclic amides, imides, and imidates, usually containing one non-epoxy cyclic moiety although compounds with linked or fused moieties are also contemplated.

Most often, the epoxyalkyl groups are bonded directly to the oxygen or nitrogen atoms; however, compounds containing intervening structures, such as 2-carboglycidyloxyethyl compounds, may also be used. The presence of more than one epoxy group per molecule is essential. At least three of such groups are preferred, by reason of the ease of preparation therefrom of branched polyesters with a minimum of crosslinking and resulting gel formation.

Illustrative cyclic nuclei which may be present are the triazine, barbiturate, hydantoin, uracil, pyromellitic diimide, piperazinedione, and parabanate ring systems. As previously noted, the epoxy-containing functionalities may be present as substituents on oxygen or nitrogen atoms therein, with nitrogen atoms being preferred. The most suitable compounds are triazine derivatives, including triglycidyl cyanurate and triglycidyl isocyanurate (TGIC). TGIC is particularly preferred because of its availability and particular suitability for use in the present invention.

The ratio of the polyamide (a) to the carbonate polymer (b) in the compositions and process of the invention is from 1:10 to 10:1 by weight. The amount of the polyepoxy compound (c) is an effective amount for effecting the copolymerization but in general will be in the range of about 0.01 to 50% of the combined weight of the components (a) and (b). More preferred would be for the amount of the polyepoxy compound (c) to be in the amount of about 0.1 to 10% of the combined weight of the components (a) plus (b). Most preferred would be for the amount of the polyepoxy compound to be in the amount of from about 0.2 to about 2% of the combined weight of the components (a) plus (b). It will be evident to one skilled in the art of polymer blending that the optimum amount required will be adjusted to suit the particular choice of polyamide and carbonate polymer and the degree of carboxyl functionality on these two polymers and of amino functionality oh the polyamide, so that a sufficient number of the reactive groups on each of (a) and (b) are grafted together by the polyepoxide. Thus, within the ranges taught in the foregoing, the optimum amount of polyepoxide will be readily found by the compounder making minor adjustments in the amount of (c) dependent on the number of amino and carboxyl functional groups on the polyamide and the number of carboxyl functional groups on the carbonate polymer, and on the extent of grafting that is desired for the particular application.

The process of the invention consists in causing the three ingredients (a), (b) and (c) to react, specifically to cause the coupling of (a) and (b) by way of the epoxy-ring-opened moiety derived from (c). This will take place by admixing (a), (b) and (c) at temperatures in the range of about 100 degrees C. to about 400 degrees C. (preferably by melt blending in an extruder or other high torque blending device at about 250 degrees C. to about 350 degrees C.) for times from about 0.1 minute to one hour (preferably for times typical of extrusion which are from about 0.5 minutes to about 20 minutes).

The components may be first mixed by dry blending; an option in the blending is to blend one of the ingredients first with another of the ingredients to make a concentrate, and then to blend the third ingredient. In the case of the present invention, since TGIC is somewhat hazardous, it is often found best to blend it with one of the polymer ingredients (a) or (b) to make a relatively easily handled concentrate, which is then conveniently blended with the other polymer ingredient, as described in U.S. patent applications Ser. No. 125,859 filed Nov. 27, 1987 and Ser. No. 184,534 filed Apr. 21, 1984, and in European Patent Applications Ser. No. 311,681 filed Apr. 19, 1989 and Ser. No. 317,797 filed May 31, 1989, all incorporated herein by reference.

The completion of the reaction can be noted when an essentially stable rheology is observed, exhibiting elasticity but with enough flow to indicate the absence of gellation, such rheology being characteristic of a high molecular weight branched polymer.

In addition to the use of the block copolymers of the invention by themselves as thermoplastics for molding, extruding, coating and the like, they can be used as compatibilizing agents for making delamination-resistant blends of polyamides and carbonate polymers. The polyamides are as hereinabove defined.

Suitable carbonate polymers for such blends include aromatic polycarbonates as well as aromatic polyester-carbonates. The method of preparation of aromatic polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are krown, and the reactive groups are the two phenolic hydroxyl groups. Some of the dihydric phenols are represented by the general formula:

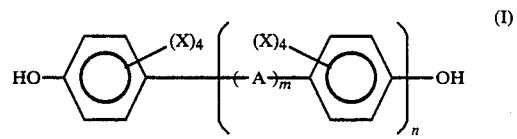

(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$; —O—: or —C—; wherein each X is independently selected from the group consisting of hydrogen, halogen, and a monovalent hydrocarbon radical such as an alkyl group of from 1 to about 8 carbon atoms, an aryl group of from 6—18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl)

sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl pnthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyester-polycarbonates, i.e., resins which contain, in addition to recurring polycarbonate chain units of the formula:

$$-O-D-O-C(O)- \tag{IIa}$$

wherein D is a divalent aromatic radical of the dihydric phenol employed in the polymerization reaction, repeating or recurring carboxylate units, for example of the formula:

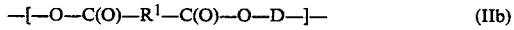
$$-[-O-C(O)-R^1-C(O)-O-D-]- \tag{IIb}$$

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \tag{III}$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-E-$$

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

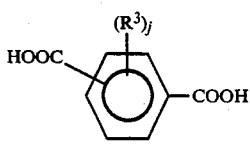

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyestercarbonate of 80 mole percent ester bonds.

The preferred polycarbonates for use in the blends with polyamides in accordance with the present invention are those derived from bisphenol A and phosgene and having an intrinsic viscosity of about 0.3 to about 1.5 deciliters per gram in methylene chloride at 25°.

Such blends are made compatible by admixture of an effective amount of the block copolymer made from components (a), (b) and (c) as described above; an effective amount will typically be in the range of from 1 to 99% by weight, more preferred from about 2 to 90% by weight, and most preferred from about 5 to 50% by weight.

The blends of the invention may be further modified by the addition of other types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, flame retardants, ultraviolet screening agents, and the like.

The invention will be better understood with reference to the following examples, which are presented for purposes of illustration rather than for limitation, and which set forth the best mode contemplated for carrying out the invention.

EXAMPLE 1

Preparation of carboxy-terminated polycarbonate

A mixture of 29.1 g (128 mmole) of bisphenol A, 65 ml of methylene chloride, 55 ml of water, and 2.58 ml of triethylamine (added in the form of a 5% w/v solution in methylene chloride) and 3.5 mole % of a carboxylated phenol was stirred at room temperature and a 50% aqueous solution of sodium hydroxide was added to bring the pH to 11. Phosgene was then passed through the mixture for 18 minutes at 0.8 g/min, with maintenance of the pH at 11, to provide a 25% excess of phosgene. Additional methylene chloride was added as necessary to control the viscosity.

When the reaction was complete, the organic phase was removed and washed once with 7% aqueous hydrochloric acid solution and three times with water. The thus-produced carboxy-functionalized polycarbonate was precipitated into methanol, filtered out, and dried in vacuum.

In the case where the carboxyphenol used was p-hydroxybenzoic acid, a polycarbonate of molecular weight 56,000 and Mw/Mn of 5.6 was obtained. This polymer is designated CT-PC in the Table given below.

Further descriptions of preparation of this class of carbonate polymer are provided in copending U.S. Patent Application Ser. No. 109,873, filed Oct. 14, 1987.

B. Preparation of isopropyl diphenolate

In a 3-1 flask fitted with a Dean-Stark trap were mixed 572 g (2.0 moles) of diphenolic acid, 1500 of isopropanol, and 10 g of toluenesulfonic acid. The mixture was refluxed for 22 hours, with gradual removal of 500 ml of condensate (which, from azeotrope tables, should be 12% water). Then, 1 of methylene chloride and 1 L of water were mixed into the reaction mixture, and the methylene chloride layer then separated and washed with water until the pH of the washings was 5. Drying over $MgSO_4$ and removal of solvent yielded 631 g of crystalline solid. Recrystallization of the product from 500 ml of ethyl acetate and washing with three 50 ml portions of ethyl acetate yielded 498 g of powder, mp 128°–130.5° C. with nmr indicating the desired isopropyl ester had been obtained.

C. Preparation of carbonate polymer with isopropyl diphenolate links in the main chain (ester-sidechain modified carbonate polymer)

A 3-1 four-neck flask was fitted with a mechanical stirrer, a pH measuring probe, an aqueous caustic inlet tube, and a Claisen adaptor to which was attached a dry ice condenser and a gas inlet tube. To the flask was added 560 ml of water, 680 ml of methylene chloride, 2.8 ml (0.02 mole) of triethylamine, 1.65 g (0.0175 mole, 3.5 mole %) of phenol, 114 g (0.475 mole) of bisphenol A and 0.025 mole of isopropyl diphenolate (from procedure A. above). With stirring, the pH of the mixture was raised to 10 by addition of 25% aqueous sodium hydroxide, then phosgene was introduced into the flask at 1 g/min for 60 minutes (total of 0.6 mole of phosgene) while maintaining the pH at 9.5 to 11.5. At the end of the reaction, the pH was adjusted to 11. The resin layer was separated from the brine layer, washed with 3 wt. % hydrochloric acid until the washings remained acidic, then washed twice with distilled water. The resin was then precipitated into 3-1 of methanol in a Waring blender, then washed with additional methanol and dried.

The product was a polycarbonate having an intrinsic viscosity of 0.467 dl/g and a Tg of 146° C. It contained 5 mole % of the isopropyl ester units derived from the isopropyl diphenolate. This ester-side-group modified carbonate polymer is designated as ESG-PC.

Further examples of this class of carbonate polymer are available in copending U.S. patent application Ser. No. 280,845 filed Dec. 7, 1988.

D. Preparation of block copolymers of carbonates and polyamides.

Samples were prepared by charging 25 g. each of component A and component B, as well as 0.50 g. of the linking agent (except in comparison runs without the linking agent, into the mixing bowl of a Brabender apparatus. These samples were then melt blended at 300° C. and 150 rpm for 20 minutes.

Copolymer analysis was then conducted on the mixtures thus prepared, by running an extraction with chloroform in a Soxhlet extraction system for 13 hours. Before placing in the extraction thimble, samples of 10 g. were ground in a Wiley mill with liquid nitrogen cooling. The copolymer content was determined by the average of the material lost from the extraction thimble and the amount of extracted material recovered from the solution abstract. Since polyamide is insoluble in chloroform, the percent copolymer is based on the percentage amount of polycarbonate in the blend.

The properties of the mixed material in the Brabender were also observed as an indication of the occurrence or nonoccurrence of a reaction, and as an indication of the nature of the reaction. For instance, a normal melt means that after mixing, the mixture was of typical viscosity of the components and very sticky. This is behavior indistinguishable from the behavior of carbonate alone. The occurrence of a rubbery melt means that after mixing, the resultant material showed very high melt viscosity, and the melt showed a significant amount of elasticity when removed from the mixing chamber and was non-sticky. The occurrence of a very rubbery melt means that after mixing, the material appeared to be of extremely high melt viscosity and almost but not quite gelled. It showed a high degree of elasticity but deformed in a fluid fashion. This is characteristic of a highly branched thermoplastic. The experimental results on a series of such mixtures are shown in the following Table:

TABLE 1

| Sample No. | Component (a) | Component (b) | Linking Agent | % Copolymer | Character of melt |
|---|---|---|---|---|---|
| 1 | nylon | CT-PC | TGIC | 43.6 | very rubbery |
| 2 | nylon | ESG-PC | TGIC | 23.5 | rubbery |
| 3 | nylon | PC | TGIC | 18.1 | rubbery |
| 4 | nylon | ESG-PC | none | 0.2 | normal melt |
| 5 | nylon | CT-PC | none | 25.6, 19.1 | normal melt |
| 6 | nylon | CT-PC | none | 5.0 | normal melt |
| 7 | nylon | CT-PC | none | 7.4 | normal melt |
| 8 | nylon | nylon | TGIC | — | normal melt |

Notes to table:
CT-PC = carboxy-terminated polycarbonate made in accordance with example 1A above.
ESG-PC = ester-side-chain polycarbonate made in accordance with example 1C above.
nylon = Zytel 330 amorphous nylon made by DuPont.
TGIC = triglycidyl isocyanurate These data show that a copolymer was formed in good yield in the cases where TGIC was present as a linking agent, and that this copolymer was of high molecular weight and branchy. By contrast, without TGIC, either little or no copolymer formed or a low molecular weight product formed, which did not exhibit the rheology of a high molecular weight branchy product.

Both the carboxy-end-group functionalized polycarbonate and the ester-side-chain polycarbonate (with an eliminatable alkyl group on the ester) were effective reactants with polyamide for formation of a block copolymer in the presence of TGIC.

The result of sample 3 shows that a non-carboxy containing polycarbonate in admixture with polyamide and TGIC in accordance with the teachings of Maresca, Eur. Pat. No. 227053 (July 1, 1987) gives less copolymer than the use of carboxyl-containing or carboxyl-forming carbonate polymers with TGIC as the linking agent.

What is claimed is:

1. A process for preparing block copolymers of polyamides and carbonate polymers which comprises the admixture of a polyamide with an carboxyl-functional carbonate polymer together with an effective linking amount of a polyepoxy compound selected from the group consisting of poly O- or N-epoxyalkyl-substituted cyclic amides, imides and imidates, this admixture being conducted under conditions such as to effect the reaction of said linking agent with said polyamide and said carbonate polymer.

2. The process defined in claim 1 wherein said polyepoxy compound is triglycidyl isocyanurate.

3. The process of claim 2 wherein said carboxyl-functional carbonate polymer is selected from the group consisting of carbonate polymers having carboxyl groups as end groups or side chain groups, or having ester groups which undergo elimination reactions to produce carboxyl groups under the conditions of said admixture.

4. The process of claim 3 wherein said carboxyl-functional carbonate polymer is selected from the group consisting of carbonate polymers having at least one group in the chain of the structure:

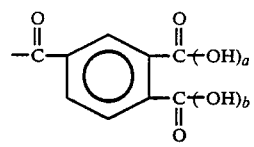

wherein a and b are each whole number integers of from 0 to 1 and the sum of a+b is 1.

5. The process of claim 3 wherein said carboxyl-functional carbonate polymer has at least one group in the chain of the structure:

—[—O—phenyl(COOH)—(E)$_a$—phenyl(COOR'—)—O—C(=O)—]— wherein E is selected from the group consisting of alkylene containing from 1 to 15 carbon atoms, inclusive, and halogen-substituted alkylene containing from 1 to 15 carbon atoms, inclusive, a is an integer of 0 to 1 and R' is hydrogen or hydrocarbyl or halogen-substituted hydrocarbyl amenable to beta elimination to form olefin and carboxyl group upon thermal degradation.

6. The process of claim 3 wherein said carboxyl-functional carbonate polymer has at least one group in the chain of the structure:

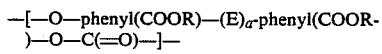

[where E and a are as hereinfore defined] wherein E is selected from the group consisting of alkylene containing from 1 to 15 carbon atoms, inclusive, and halogen-substituted alkylene containing from 1 to 15 carbon atoms, inclusive; a is an integer of 0 to 1 and each R is independent and is a hydrocarbyl group or a halogen-substituted hydrocarbyl group amenable to beta-elimination upon exposure to heat.

7. The process of claim 3 wherein said carboxyl-functional carbonate polymer has at least one group in the chain of the structure:

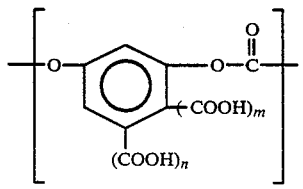

wherein m and n each represent a whole number integer of 0 to 1 and the sum of m plus n equals 1.

8. The process of claim 3 wherein said carboxyl-functional carbonate polymer has at least one group in the chain of the structure: of the formula:

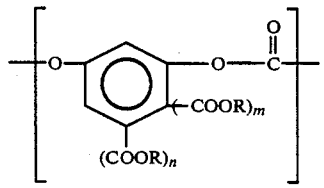

wherein m and n each represent a whole number integer of 0 to 1 and the sum of m plus n equals 1 and where each R is independent and is a hydrocarbyl group or a halogen-substituted hydrocarbyl group amenable to beta-elimination upon exposure to heat.

9. The process of claim 2 wherein said conditions comprise a temperature of from about 100 to about 400 degrees C. and a time from about 0.1 minute to about 1 hour.

10. A block copolymer having at least one polyamide and at least one carbonate polymer block, said block copolymer being produced by the admixture of a polyamide with an carboxyl-functional carbonate polymer together with an effective amount of a linking agent comprising a polyepoxy compound, selected from the group consisting of poly O- or N-epoxyalkyl-substituted cyclic amides, imides and imidates, said admixture being conducted under conditions such as to effect the reaction of said linking agent with said polyamide and said carbonate polymer.

11. A block copolymer as defined in claim 10 wherein wherein said polyepoxy compound is triglycidyl isocyanurate.

12. A block copolymer as defined in claim 11 wherein said carboxyl-functional carbonate polymer is selected from the group consisting of carbonate polymers having carboxyl groups as end groups or side chain groups, or having ester groups which undergo elimination reactions to produce carboxyl groups under the conditions of said admixture.

13. A block copolymer as defined in claim 11 wherein said carboxyl-functional carbonate polymer is selected from the group consisting of carbonate polymers having at least one group in the chain of the structure:

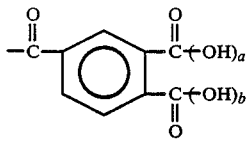

wherein a and b are each whole number integers of from 0 to 1 and the sum of a+b is 1.

14. A block copolymer as defined in claim 11 wherein said carboxyl-functional carbonate polymer has at least one group in the chain of the structure:

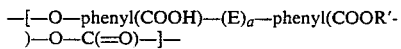

wherein E is selected from the group consisting of alkylene containing from 1 to 15 carbon atoms, inclusive, and halogen-substituted alkylene containing from 1 to 15 carbon atoms, inclusive, a is an integer of 0 to 1 and R' is hydrogen or hydrocarbyl or halogen-substituted hydrocarbyl amenable to beta elimination upon thermal degradation.

15. A block copolymer as defined in claim 11 wherein said carboxyl-functional carbonate polymer has at least one group in the chain of the structure:

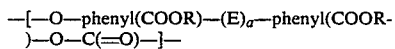

[where E and a are as hereinbefore defined] wherein E is selected from the group consisting of alkylene containing from 1 to 15 carbon atoms, inclusive, and halogen-substituted alkylene containing from 1 to 15 carbon atoms, inclusive; a is an integer of 0 to 1 and each R is independent and is a hydrocarbyl group or a halogen-substituted hydrocarbyl group amenable to beta-elimination upon exposure to heat.

16. A block copolymer as defined in claim 11 wherein said carboxyl-functional carbonate polymer has at least one group in the chain of the structure:

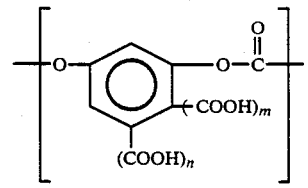

herein m and n each represent a whole number integer of 0 to 1 and the sum of m plus n equals 1.

17. A block copolymer as defined in claim 11 wherein said carboxyl-functional carbonate polymer has at least one group in the chain of the structure:

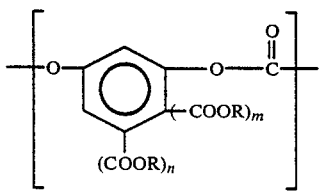

wherein m and n each represent a whole number integer of 0 to 1 and the sum of m plus n equals 1 and where each R is independent and is a hydrocarbyl group or a halogen-substituted hydrocarbyl group amenable to beta-elimination upon exposure to heat.

18. A process for the blending of a polyamide and a carbonate polymer which comprises admixing said polyamide and carbonate polymer with an effective compatibilizing amount of a block copolymer as defined in claim 11.

19. A process as defined in claim 1 wherein said polyamide is selected from the group consisting of amorphous polyamide nylon 6,I and crystalline polyamides nylon 6 and nylon 6,6.

20. A process as defined in claim 1 wherein said polyepoxy compound is added in the amount of from about 0.1 to about 10% of the combined weights of said polyamide and said carbonate polymer.

21. A process as defined in claim 1 wherein said polyepoxy compound is added in the amount of from about 0.2 to about 2% of the combined weights of said polyamide and said carbonate polymer.

22. A process for the blending of a polyamide and a carbonate polymer as defined in claim 18 wherein said block copolymer is added in the amount of about 2 to 90% by weight.

23. A process for the blending of a polyamide and a carbonate polymer as defined in claim 18 wherein said block copolymer is added in the amount of about 5 to 50% by weight.

24. A block copolymer as defined in claim 10 wherein said polyepoxy compound is added in the amount of from about 0.1 to about 10% of the combined weight of said polyamide and said carbonate polymer.

25. A block copolymer as defined in claim 10 wherein said polyepoxy compound is added in the amount of from about 0.2 to about 2% of the combined weight of said polyamide and said carbonate polymer.

26. A blend of a polyamide and a carbonate polymer which further comprises a compatibilizing amount of a block copolymer as defined in claim 10.

27. A blend of a polyamide and a carbonate polymer as defined in claim 26 wherein said block copolymer is added at from about 2 to about 90% by weight.

28. A blend of a polyamide and a carbonate polymer as defined in claim 26 wherein said block copolymer is added at from about 5 to about 50% by weight.

* * * * *

UNITED STATES PATENT AND TRADEMARK OFFICE
CERTIFICATE OF CORRECTION

PATENT NO. : 4,960,836

DATED : October 2, 1990

INVENTOR(S) : James Louis DeRudder

It is certified that error appears in the above-identified patent and that said Letters Patent is hereby corrected as shown below:

Col. 1, line 9, delete "each" and add --such--

Col. 5, line 8, delete "oh" and add --on--

Col. 10, line 38, delete "L" after "1" and insert --1--

Col. 10, line 37, after "Then, 1" insert --1--

Signed and Sealed this

Eleventh Day of February, 1992

Attest:

HARRY F. MANBECK, JR.

Attesting Officer

Commissioner of Patents and Trademarks